United States Patent
Yokoya

(10) Patent No.: US 11,491,470 B2
(45) Date of Patent: Nov. 8, 2022

(54) OXYGEN STORAGE MATERIAL

(71) Applicant: TOYOTA JIDOSHA KABUSHIKI KAISHA, Toyota (JP)

(72) Inventor: Takuro Yokoya, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 53 days.

(21) Appl. No.: 17/106,656

(22) Filed: Nov. 30, 2020

(65) Prior Publication Data
US 2021/0205793 A1  Jul. 8, 2021

(30) Foreign Application Priority Data
Jan. 8, 2020 (JP) .............................. JP2020-001461

(51) Int. Cl.
| | |
|---|---|
| *B01J 23/10* | (2006.01) |
| *B01J 23/42* | (2006.01) |
| *B01J 23/44* | (2006.01) |
| *B01J 23/46* | (2006.01) |
| *B01J 23/83* | (2006.01) |

(Continued)

(52) U.S. Cl.
CPC .............. *B01J 23/83* (2013.01); *B01D 53/94* (2013.01); *B01J 23/44* (2013.01); *B01D 2255/1023* (2013.01); *B01D 2255/908* (2013.01)

(58) Field of Classification Search
CPC ... B01J 23/10; B01J 23/42; B01J 23/44; B01J 23/464; B01J 23/83; B01J 23/8926; B01D 53/94

USPC ................................. 502/302–304, 346, 339
See application file for complete search history.

(56) References Cited

U.S. PATENT DOCUMENTS

| | | | | |
|---|---|---|---|---|
| 5,306,697 | A | * | 4/1994 | Salama ............... H01L 39/2419 252/519.1 |
| 5,418,389 | A | * | 5/1995 | Watanabe .......... G11C 13/0007 257/295 |

(Continued)

FOREIGN PATENT DOCUMENTS

| | | | |
|---|---|---|---|
| JP | 2017-020815 A | | 1/2017 |
| JP | 2019-189485 A | | 10/2019 |
| WO | 2010/010714 A1 | | 1/2010 |

OTHER PUBLICATIONS

Chou, F.C. et al., New phases induced by hydrogen reduction and by subsequent oxidation of L2CuO4 (L=LA,Pr,Nd,Sm,Eu,Gd), The American Physical Society, vol. 42, No. 10, Oct. 1990.

(Continued)

*Primary Examiner* — Cam N. Nguyen
(74) *Attorney, Agent, or Firm* — Oliff PLC

(57) ABSTRACT

The invention provides an oxygen storage material having high oxygen storage capacity and high thermal durability. The oxygen storage material of the invention has some of the La sites of $La_2CuO_4$ with a $K_2NiF_4$-type crystal structure replaced by Ce. The oxygen storage material may have the composition $La_{(2.00-x)}Ce_xCuO_4$ ($0.20 \geq x > 0.00$). The oxygen storage material may also have a precious metal supported. The precious metal may be Pt, Pd or Rh. The exhaust gas purification catalyst is an exhaust gas purification catalyst comprising an oxygen storage material according to the invention.

4 Claims, 3 Drawing Sheets

(51) Int. Cl.
B01J 23/89 (2006.01)
B01D 53/94 (2006.01)

(56) References Cited

U.S. PATENT DOCUMENTS

| | | | | |
|---|---|---|---|---|
| 5,462,917 | A * | 10/1995 | Salama | H01L 39/2419 |
| | | | | 419/25 |
| 5,508,257 | A * | 4/1996 | Sibata | H01L 39/12 |
| | | | | 428/930 |
| 6,527,856 | B2 * | 3/2003 | Abraham | C30B 29/225 |
| | | | | 117/1 |
| 7,329,627 | B2 * | 2/2008 | Wanninger | B01D 53/944 |
| | | | | 502/304 |
| 8,060,169 | B1 * | 11/2011 | Bednorz | C01G 3/00 |
| | | | | 505/211 |
| 2019/0321807 | A1 | 10/2019 | Goto et al. | |

OTHER PUBLICATIONS

Shimizu, Youichi et al., "A thick-film impedancemetric carbon monoxide sensor using layered perovskite-type cuprate", Sensors and Actuators B: Chemical, Elsevier BV, NL, vol. 249, pp. 667-672, 2017.

Tsukada A. et al., "Doping of Ce in T-La2CuO4: Rigorous test for electron-hole symmetry for high-Tc superconductivity", Physical Review B, vol. 74, No. 17, pp. 174515-1-174515-8, 2006.

Tsukada A. et al., "Ce doping in T-La2CuO4 films: Broken electron-hole symmetry for high-Tc superconductivity", Physica C, Elsevier, vol. 426-431, pp. 454-458, 2005.

* cited by examiner

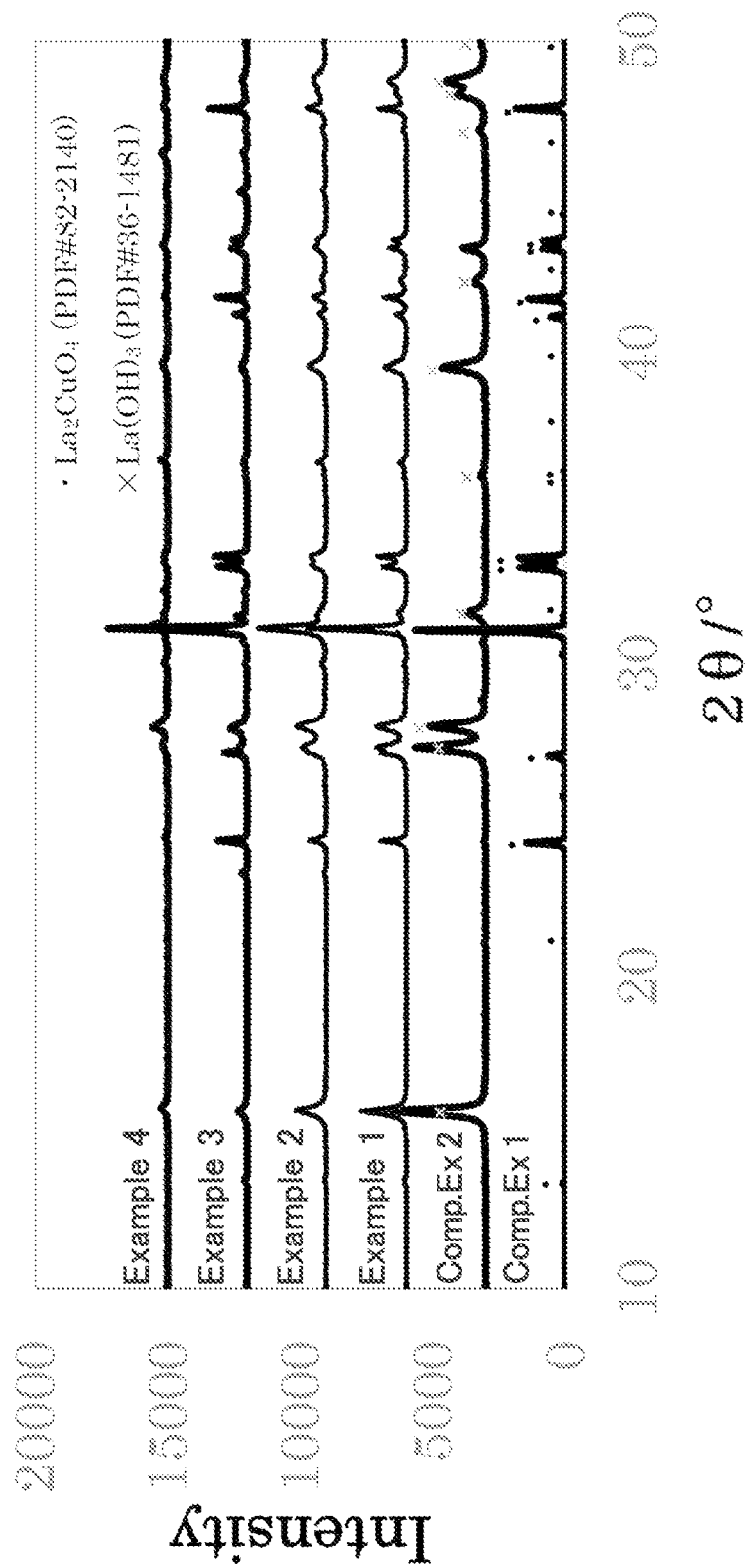

OXYGEN STORAGE MATERIAL

FIELD

The present disclosure relates to an oxygen storage material.

BACKGROUND

Composite oxides comprising various metal oxides have been utilized in the prior art as supports or co-catalysts for exhaust gas purification catalysts. Metal oxides used in such composite oxides include oxygen storage materials, which allow absorption and release of oxygen in response to the oxygen partial pressure in the atmosphere.

NPL 1 discloses that $La_2CuO_4$ having a $K_2NiF_4$-type (T-type) structure has high oxygen storage capacity, allowing it to be used as an oxygen storage material.

CITATION LIST

Non-Patent Literature

[NPL 1] Chou et al, Physical Review B Volume 42, Number 10, p6172-6180 New phases induced by hydrogen reduction and by subsequent oxidation of $Lu_2CuO_4$ (L=La, Pr, Nd, Sm, Eu, Gd)

SUMMARY

Technical Problem

The present inventors have investigated implementing $K_2NiF_4$-type (T-type) $La_2CuO_4$ (hereunder referred to simply as "$La_2CuO_4$") as an oxygen storage material.

The present inventors have found, as a result, that the oxygen storage capacity is lowered in a high-temperature heat durability test for $La_2CuO_4$, such as in a heat durability test that assumes use as an oxygen storage material for a vehicle exhaust gas catalyst.

It is an object of the present disclosure to provide an oxygen storage material having high oxygen storage capacity and high thermal durability.

Solution to Problem

The present inventors have found that this object can be achieved by the following means.

<Aspect 1>

An oxygen storage material wherein some of the La sites of $La_2CuO_4$ having a $K_2NiF_4$-type crystal structure are replaced with Ce.

<Aspect 2>

The oxygen storage material according to aspect 1, which has the composition $La_{(2.00-x)}Ce_xCuO_4$ ($0.20 \geq x > 0.00$).

<Aspect 3>

The oxygen storage material according to aspect 1 or 2, wherein a precious metal is supported thereon.

<Aspect 4>

The oxygen storage material according to aspect 3, wherein the precious metal is Pt, Pd or Rh.

<Aspect 5>

An exhaust gas purification catalyst comprising an oxygen storage material according to any one of aspects 1 to 4.

Advantageous Effects of Invention

According to the present disclosure it is possible to provide an oxygen storage material having high oxygen storage capacity and high thermal durability.

BRIEF DESCRIPTION OF DRAWINGS

FIG. 3 is a graph showing an X-ray diffraction pattern for the oxygen storage materials of Examples 1 to 4 and Comparative Examples 1 and 2.

DESCRIPTION OF EMBODIMENTS

Figure 1:
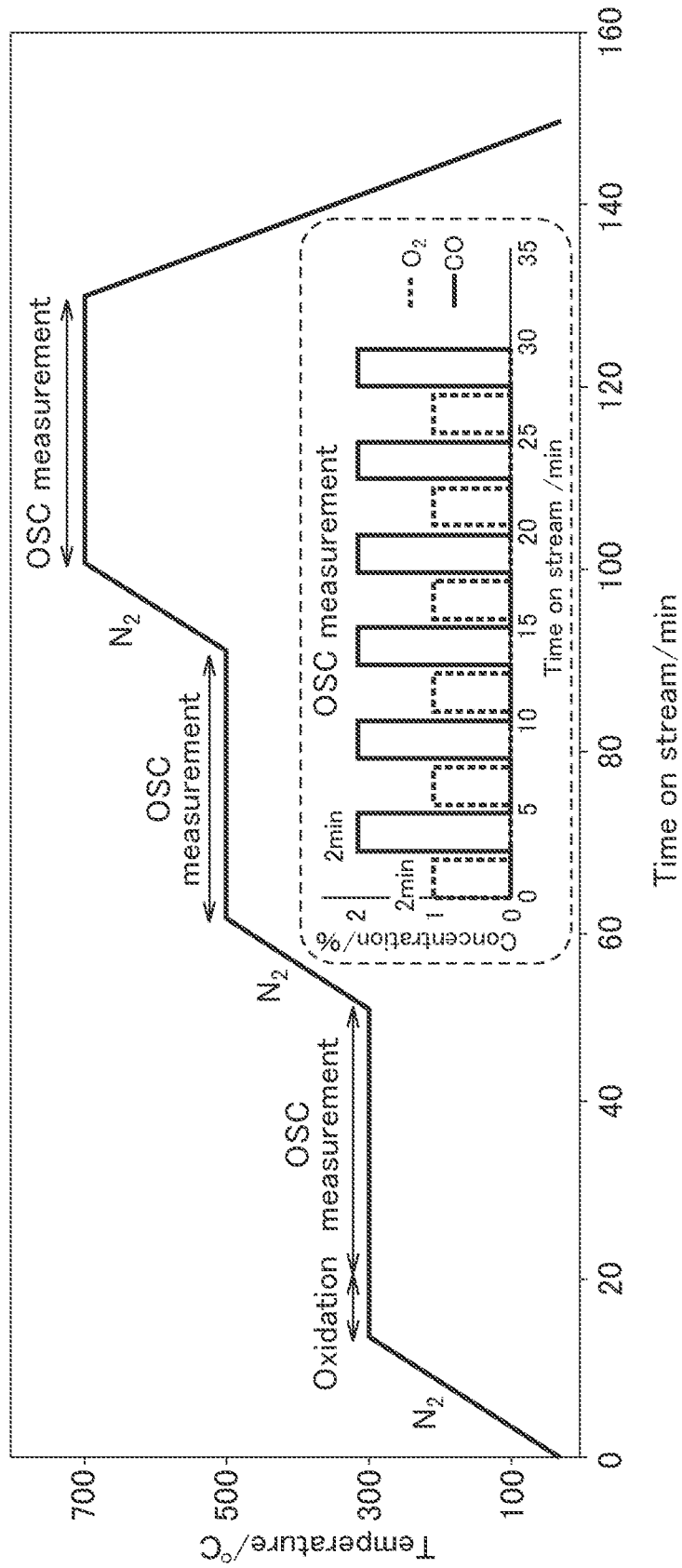
FIG. 1 is a graph showing the temperature profile in measurement of the oxygen storage capacity of the oxygen storage materials of Examples 1 to 4 and Comparative Examples 1 and 2.

Embodiments of the disclosure will now be explained in detail. The disclosure is not limited to the embodiments described below, however, and various modifications may be implemented such as do not depart from the gist thereof.

<Oxygen Storage Material>

The oxygen storage material of the disclosure is an oxygen storage material wherein some of the La sites of $La_2CuO_4$ are replaced with Ce. For this disclosure, the $La_2CuO_4$ may have a composition deviating from La:Cu:O=2:1:4, within a range that maintains a $K_2NiF_4$-type crystal structure.

In a high-temperature heat durability test for $La_2CuO_4$, such as a heat durability test that assumes use as an oxygen storage material for a vehicle exhaust gas catalyst, repeated carbon monoxide reduction/oxygen oxidation at 1050° C. in the presence of water vapor causes the crystal structure of $La_2CuO_4$ to break down, being decomposed into $La_2O_3$ and CuO.

This lowers the oxygen storage capacity because $La_2O_3$ does not have oxygen storage capacity while CuO does have oxygen storage capacity, but CuO has a very low area-to-weight ratio since the Cu produced by carbon monoxide reduction at high temperature is easily sintered.

For these reasons, conducting a heat durability test for $La_2CuO_4$ at high temperature lowers its performance as an oxygen storage material.

In contrast, an oxygen storage material having some of the La sites of $La_2CuO_4$ replaced by Ce will have lower reduction in oxygen storage capacity even when conducting a heat durability test at high temperature.

This is believed to be because the Ce ion radius (approximately 1.27 angstrom) is smaller than the ion radius of La (approximately 1.39 angstrom), such that the crystal structure of $La_2CuO_4$ where some of the La sites are replaced with Ce is more rigid, making it less likely to decompose into $La_2O_3$ and CuO even in a high-temperature heat durability test.

The oxygen storage material of this disclosure may have the composition $La_{(2.00-x)}Ce_xCuO_4$ ($0.20 \geq x > 0.00$), i.e. more than 0.0% and up to 10.0% of all of the La sites of $La_2CuO_4$ are replaced by Ce.

If the amount of Ce (the value of "x") in the composition $La_{(2.00-x)}Ce_xCuO_4$ ($0.20 \geq x > 0$) is within the range specified above, there will be relatively little variation in the crystal structure due to the Ce at La sites, and it will be possible to maintain high crystallinity while ensuring a firm crystal structure. It will therefore be possible to better maintain the oxygen storage capacity after a high-temperature heat durability test.

The amount of Ce (the value of "x") in the composition $La_{(2.00-x)}Ce_xCuO_4$ ($0.20 \geq x > 0$) may be greater than 0, 0.01 or greater, 0.02 or greater, 0.05 or greater or 0.10 or greater, and 0.20 or smaller, 0.15 or smaller, 0.10 or smaller or 0.05 or smaller.

To further increase the oxygen storage capacity, the oxygen storage material of the disclosure may support a catalyst metal, more specifically a precious metal, and even more specifically Pt, Pd or Rh.

The oxygen storage material of the disclosure can be produced by a common method for producing a $K_2NiF_4$-type (T-type) composite oxide using a La salt, Ce salt and Cu salt.

For example, a metal oxide precursor can be obtained by forming a metal hydroxycarboxylic acid complex (a hydroxycarboxylic acid complex containing La, Ce and Cu) in a solution containing a La salt, Ce salt and Cu salt as a starting metal salt, a hydroxycarboxylic acid and a glycol, and then forming a polymer gel dispersing the metal hydroxycarboxylic acid complex, by esterification reaction between the hydroxycarboxylic acid and glycol in the solution, and thermally decomposing the polymer gel that is formed. The metal oxide precursor may then be fired to obtain an oxygen storage material in which some of the La sites of $La_2CuO_4$ are replaced with Ce.

The method of supporting the catalyst metal on the oxygen storage material of the disclosure may be a publicly known method.

<Exhaust Gas Purification Catalyst>

The exhaust gas purification catalyst of the disclosure comprises the oxygen storage material of the disclosure. The exhaust gas purification catalyst of the disclosure may be a three-way catalyst, for example.

EXAMPLES

Examples 1 to 4 and Comparative Examples 1 and 2

Oxygen storage materials for Examples 1 to 4 and Comparative Examples 1 and 2 were prepared as described below.

Example 1

Heat durability-tested $La_{1.99}Ce_{0.01}CuO_4$ supporting 1 mass % Pd was obtained as a sample for Example 1, in the following manner.

Lanthanum(III) nitrate hexahydrate, cerium(III) nitrate hexahydrate and copper(II) nitrate trihydrate were dissolved in distilled water in a molar ratio of 1.99:0.01:1.00. After adding 9 equivalents of citric anhydride with respect to Cu in the obtained solution, 36 equivalents of ethylene glycol were added with respect to Cu and the mixture was heated at 120° C. Heating was continued at 300° C. for 8 hours, and after grinding the dried sample, it was fired in air at 1000° C. for 5 hours to obtain an oxide powder.

The obtained powder was suspended in a small amount of water, and palladium nitrate-nitric acid solution was added dropwise to 1 mass % Pd with respect to the powder, and the mixture was thoroughly stirred then evaporated to dryness at 120° C.

The powder was then fired in air at 500° C. for 2 hours, to obtain $La_{1.99}Ce_{0.01}CuO_4$ powder with Pd supported at 1 mass %.

The obtained powder was compacted at 196 kN by cold isostatic pressing, and then a sieve was used for pelletizing. The pellets were set in an amount of 3 g in a fixed bed flow reactor, and as a heat durability test, they were heated from room temperature to 1050° C. while circulating 100% nitrogen at 10 L/min, and the atmosphere was switched between a reducing atmosphere (5%, 10% carbon monoxide, 10% water vapor) and an oxidizing atmosphere (10% oxygen, 10% water vapor) for 5 minutes each at a flow rate of 10 L/min, for a total of 5 hours.

The heat durability-tested pellets were used as a sample for Example 1. The sample of Example 1 was heat durability-tested $La_{1.99}Ce_{0.01}CuO_4$ supporting 1 mass % Pd.

Examples 2 to 4

Samples for Examples 2 to 4 were obtained in the same manner as Example 1, except that the molar ratios of lanthanum(III) nitrate hexahydrate, cerium(III) nitrate hexahydrate and copper(II) nitrate trihydrate were 1.95:0.05:1.00, 1.90:0.10:1.00 and 1.80:0.20:1.00.

The sample of Example 2 was heat durability-tested $La_{1.95}Ce_{0.05}CuO_4$ supporting 1 mass % Pd, the sample of Example 3 was heat durability-tested $La_{1.90}Ce_{0.10}CuO_4$ supporting 1 mass % Pd, and the sample of Example 4 was heat durability-tested $La_{1.80}Ce_{0.20}CuO_4$ supporting 1 mass % Pd.

Comparative Example 1

A sample for Comparative Example 1 was obtained in the same manner as Example 1, except that lanthanum(III) nitrate hexahydrate and copper(II) nitrate trihydrate were dissolved in distilled water at a molar ratio of 2.00:1.00 instead of lanthanum(III) nitrate hexahydrate, cerium(III) nitrate hexahydrate and copper(II) nitrate trihydrate, and heat durability testing was not carried out.

The sample of Comparative Example 1 was $La_{2.00}CuO_4$ supporting 1 mass % Pd, without heat durability testing.

Comparative Example 2

A sample for Comparative Example 2 was obtained by heat durability testing in the same manner as Example 1, using a sample prepared in the same manner as Comparative Example 1.

The sample of Comparative Example 2 was heat durability-tested $La_{2.00}CuO_4$ supporting 1 mass % Pd.

<Evaluation of Oxygen Storage Capacity>
<Method>

The oxygen storage capacity was evaluated using a fixed bed flow reactor.

The samples of Examples 1 to 4 and Comparative Examples 1 and 2 were pretreated by circulation of an oxygen 5%/nitrogen 95% mixed gas at 10 L/min for 5 minutes at 300° C. The oxygen storage capacity was then measured at 300° C., 500° C. and 700° C., according to the temperature profile shown in FIG. 1.

Figure 2:
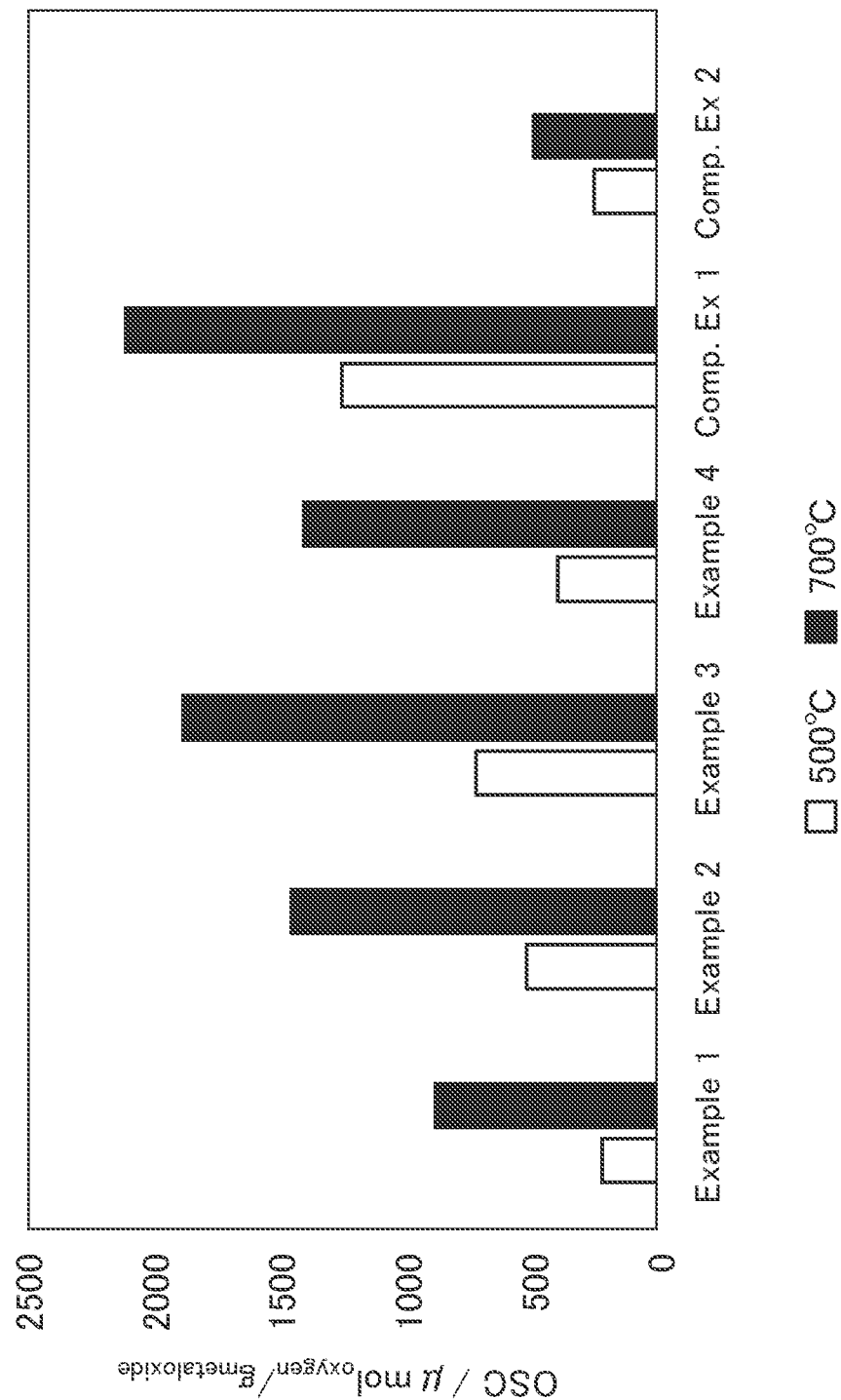
FIG. 2 is a graph showing the measurement results for oxygen storage capacity of the oxygen storage materials of Examples 1 to 4 and Comparative Examples 1 and 2.

A cycle of 1% oxygen for 2 minutes at a constant flow rate of 10 L/min→nitrogen substitution for 30 seconds→2% CO for 2 minutes was repeated 6 times at each temperature, the amount of $CO_2$ (μmol) detected during CO circulation was summed for the 2nd, 3rd, 4th and 5th cycles and divided by 4, and this value was further divided by the sample amount of 2 g to determine the oxygen storage capacity (μmol/g).
<Results>
Table 1 and FIG. 2 show the conditions for preparation of the samples of Examples 1 to 4 and Comparative Examples 1 and 2, and evaluation of the oxygen storage capacities of the samples at 500° C. and 700° C.

content resulted in weaker peak intensity of the diffraction peaks attributed to $La(OH)_3$ and stronger intensity of the X-ray diffraction pattern resembling an X-ray diffraction pattern attributable to $La_2CuO_4$. This is thought to be because replacement of some of the La sites with Ce increased resistance to carbon monoxide/oxygen and water vapor at 1050° C. in the heat durability test, making decomposition less likely to occur.

TABLE 1

| Example | Sample preparation conditions | | | Oxygen storage capacity (μmol/g) | |
| --- | --- | --- | --- | --- | --- |
| | Composition of oxygen storage material | Pd-supporting amount (mass %) | Heat durability test conducted | 500° C. | 700° C. |
| Example 1 | $La_{1.99}Ce_{0.01}CuO_4$ | 1 | Yes | 213 | 877 |
| Example 2 | $La_{1.95}Ce_{0.05}CuO_4$ | 1 | Yes | 514 | 1450 |
| Example 3 | $La_{1.90}Ce_{0.10}CuO_4$ | 1 | Yes | 714 | 1880 |
| Example 4 | $La_{1.80}Ce_{0.20}CuO_4$ | 1 | Yes | 389 | 1400 |
| Comp. Ex. 1 | $La_{2.00}CuO_4$ | 1 | No | 1250 | 2110 |
| Comp. Ex. 2 | $La_{2.00}CuO_4$ | 1 | Yes | 246 | 486 |

As shown in Table 1 and FIG. 2, Comparative Example 1 which was $La_{2.00}CuO_4$ supporting 1 mass % Pd without heat durability testing exhibited the highest oxygen storage capacity at both 500° C. and 700° C.

When comparing the heat durability-tested samples of Examples 1 to 4 and Comparative Example 2, however, at 500° C., Examples 2 to 4 which had some of the La sites replaced with Ce exhibited higher oxygen storage capacity than Comparative Example 2 which did not have La sites replaced with Ce, with the highest performance being exhibited by Example 3 wherein the oxygen storage material composition was $La_{1.90}Ce_{0.10}CuO_4$. At 700° C., Examples 1 to 4 exhibited higher oxygen storage capacity than Comparative Example 2, with the highest performance being exhibited by Example 3.

<Powder X-Ray Diffraction>
<Method>
The samples of Examples 1 to 4 and Comparative Examples 1 and 2 were measured using CuKα (λ=1.5418 angstrom) as the X-ray source, with a step width of 10 to 50°, 0.02°/0.3 sec, a tube voltage of 50 kV and a tube current of 300 mA.
<Results>
The X-ray diffraction pattern for each Example is shown in FIG. 3.

As shown in FIG. 3, with the sample of Comparative Example 1 which was $La_{2.00}CuO_4$ without heat durability testing, strong diffraction peaks were observed at 24.37°, 27.13°, 31.14°, 33.18°, 33.87°, 41.76°, 43.37°, 43.59° and 47.84°, which coincided with the X-ray diffraction pattern attributed to $La_2CuO_4$ (PDF #82-2140).

In contrast, with the sample of Comparative Example 2 which was heat durability-tested $La_{2.00}CuO_4$, strong diffraction peaks were observed at 15.67°, 27.31°, 27.97°, 31.62°, 39.48°, 42.27°, 47.06°, 48.26° and 48.64°, which coincided with the X-ray diffraction pattern attributed to $La(OH)_3$ (PDF #36-1481). This indicates that in the heat durability test, $La_2CuO_4$ decomposed by carbon monoxide/oxygen and water vapor at 1050° C., producing $La(OH)_3$ and oxides of Cu.

In the samples of Examples 1 to 3 in which some of the La sites were replaced with Ce, some diffraction peaks attributed to $La(OH)_3$ were observed, but increasing Ce In the sample of Example 4 wherein the composition was $La_{1.80}Ce_{0.20}CuO_4$, the intensity of the peak attributed to $La(OH)_3$ was low and the peak attributed to $La_2CuO_4$ was greatly weakened. This is thought to be due to increased introduction of Ce, which increased the number of La sites replaced by Ce and resulted in lower crystallinity.

These results were also reflected in the oxygen storage capacity for each of the Examples, and specifically, as shown in FIG. 2 and Table 1, the highest oxygen storage capacity was exhibited by Example 3 which had the weakest diffraction peak attributed to $La(OH)_3$ among all of the samples except for Comparative Example 1, and also had high intensity for the diffraction peak attributed to $La_2CuO_4$. This is believed to be because more of the $La_2CuO_4$ structure remained in the sample of Example 3 than in the samples of Examples 1, 2 and 4 and Comparative Example 2.

The invention claimed is:
1. An oxygen storage material having a composition comprising $La_2CuO_4$ having a $K_2NiF_4$-type crystal structure, wherein
   some of the La sites of the $La_2CuO_4$ having a $K_2NiF_4$-type crystal structure are replaced with Ce,
   a precious metal is supported on the oxygen storage material, the precious metal being Pt, Pd or Rh, and
   the oxygen storage material has an oxygen storage capacity at 700° C. of 877 μmol/gram to 1880 μmol/gram, the oxygen storage capacity being assessed after the oxygen storage material has been exposed to a heat durability test in which the oxygen storage material was heated from room temperature to 1050° C. while circulating 100% nitrogen at 10 L/min, and the atmosphere was switched between a reducing atmosphere containing 5 to 10% carbon monoxide and 10% water vapor and an oxidizing atmosphere containing 10% oxygen and 10% water vapor for 5 minutes each at a flow rate of 10 L/min, for a total of 5 hours.
2. The oxygen storage material according to claim 1, which has the composition $La_{(2.00-x)}Ce_xCuO_4$, where $0.20 \geq x > 0.00$.
3. The oxygen storage material according to claim 1, wherein the oxygen storage capacity at 700° C. of the oxygen storage material is in the range of from 1400 μmol/gram to 1880 μmol/gram.

4. An exhaust gas purification catalyst comprising an oxygen storage material according to claim 1.

* * * * *